United States Patent [19]

Cavani

[11] 4,428,350
[45] Jan. 31, 1984

[54] HOLLOW CHARGE ENDOTHERMIC MOTOR

[76] Inventor: Tiziano Cavani, Via Bellaria, 335, Modena, Italy

[21] Appl. No.: 341,159

[22] Filed: Jan. 19, 1982

[30] Foreign Application Priority Data

Feb. 11, 1981 [IT] Italy .................. 19642 A/81

[51] Int. Cl.³ .......................................... F02M 27/04
[52] U.S. Cl. ................... 123/536; 123/143 B; 123/537
[58] Field of Search ............ 123/536, 143 B, 537, 123/538, 539

[56] References Cited

U.S. PATENT DOCUMENTS

| | | | |
|---|---|---|---|
| 4,124,003 | 11/1978 | Abe ..................................... | 123/536 |
| 4,185,593 | 1/1980 | McClure ............................ | 123/536 |
| 4,340,024 | 7/1982 | Suzuki ............................... | 123/536 |

Primary Examiner—Ronald H. Lazarus
Attorney, Agent, or Firm—Michael J. Striker

[57] ABSTRACT

An alternating endothermic engine in which by application to the explosive air-fuel mixture of electric charges of the same sign as those applied to the piston, a cavity open towards the piston is formed in the explosive mixture in such a way that, in accordance with the Munroe effect of "hollow charges", an explosive wave is concentrated on the axis of the piston.

9 Claims, 3 Drawing Figures

HOLLOW CHARGE ENDOTHERMIC MOTOR

BACKGROUND OF THE INVENTION

The use of alternating internal combustion engines for a wide number of purposes is known to all. The fuel concerned (of various types, oil-based as well as gaseous) forms, together with air, an explosive mixture which is burnt inside a space called a combustion chamber formed by a cylinder and a piston. The connecting rod fixed to the piston works the crankshaft. The power exercised on the piston, and on the other sides of the combustion chamber, is obviously that created by the pressure which the explosion produces.

In the field of explosives the so-called "hollow charge" is also well-known, this being the bursting charge constituted by an explosive mass enclosed within a metal container at one end of which a cavity is open in the direction opposite to that of the primer. This means that, instead of the explosion taking effect in all directions, it becomes concentrated into an explosive wave creating an axial jet located in a cylindrical zone the axis of which is the extension of the geometrical axis of the charge.

The shape of the cavity differs greatly from one case to another but the best are cone-shaped or hemispherical and the greatest effects are obtained from hyperbolical cavities.

Working pressure increases by about 15–20 times that created by an ordinary charge while wave speed may exceed 9000 m/sec.

In the combustion of explosive mixtures taking place in alternating internal combustion engines, whether ignited spontaneously or sparked, the above invention brings about phenomena similar to those previously stated, which phenomena considerably increase the output and power of the engine as will now be described.

SUMMARY OF THE INVENTION

In accordance with this invention, the air-fuel explosive mixture and that side of the piston facing the combustion chamber possess electric charges of the same sign and of suitable value.

Due to the phenomenon of reciprocal repulsion by electric charges of the same sign and in a combustion chamber of a suitable size and shape, within the volume of the explosive mixture a cavity is formed open towards the piston and situated on the side opposite to that of the point of ignition.

In this way by exploitation of the hollow charge known as the Munroe effect, there is a concentration of the explosive wave into an axial jet whose axis coincides with that of the piston, and the explosive effect is greatly increased. Electric charges are supplied by electrostatic and dynamoelectric generators connected by means of collectors and brushes, or by some other means, to the side of the piston communicating with the combustion chamber, and to the electrodes which give an electric charge to the fuel and air entering the combustion chamber.

In a preferred execution the electric charges possessed by the explosive mixture and by the end of the piston communicating with the combustion chamber are negative. To ensure formation of the best shaped cavity within the explosive mixture, a peduncle or similar projection is placed on the end of the piston towards the combustion chamber; the tip of the peduncle is hyperboloid, conical or some other suitable shape.

In a preferred execution this peduncle is isolated from the piston and is connected to the electricity generators.

In other executions the fixed sides of the combustion chamber are also electrically charged.

The electric charges of the combustion chamber's fixed sides and also those of that end of the piston facing the combustion chamber, those of the peduncle and of the explosive mixture are, according to the type of execution, either of a different sign or of the same sign, of different value or of the same value in order both to facilicate formation and continuance of the charges in the explosive mixture and also to give it the best possible density in the various parts of the combustion chamber, assisting formation inside the explosive mixture of a cavity suitable for securing the greatest Munroe effect.

The characteristics and purposes of the invention will be made even clearer by the following example of actuation illustrated by sketches.

DETAILED DESCRIPTION OF THE PREFERRED EMBODIMENT

Figure 1:
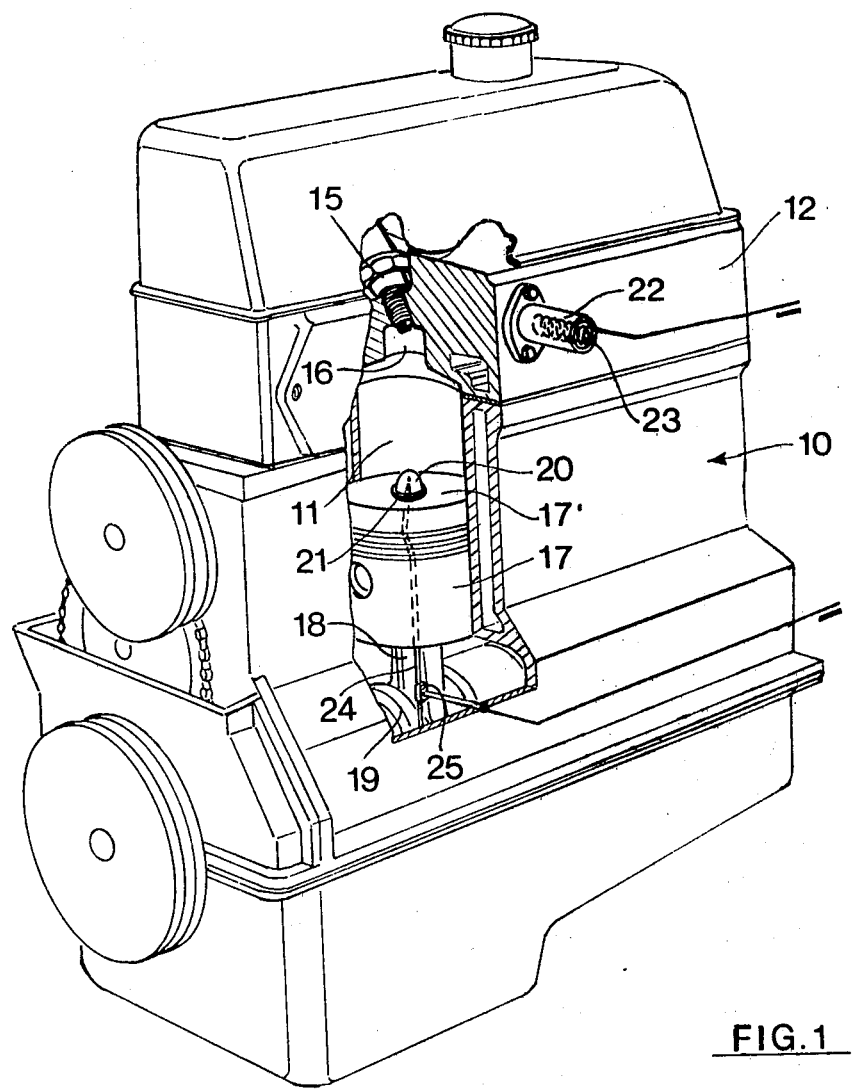
FIG. 1: shows a spark-ignited endothermic engine drawn to illustrate the purpose of the invention.
Figure 2:
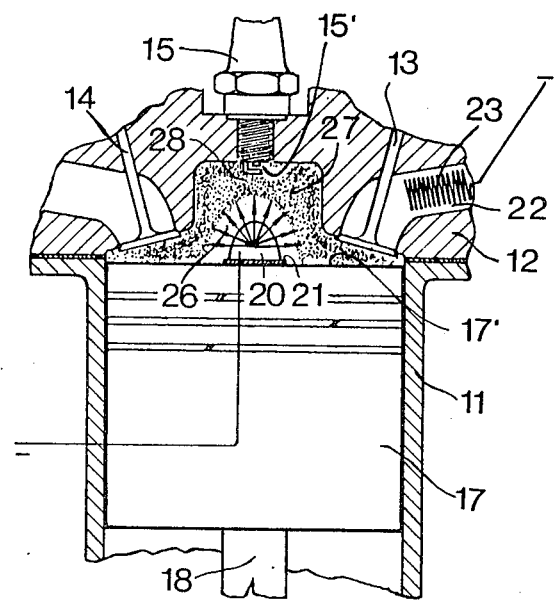
FIG. 2: shows a detail of a combustion chamber.

The engine includes a case (10), the cylinders (11), the head (12), the valves for inlet (13) and discharge (14), the plugs (15), the combustion chamber (16), the pistons (17) with connecting rods (18) and the crankshaft (19). The combustion chamber is substantially cylindrical in shape. At the summit and in the middle of the piston there is a metal peduncle (20) hyperboloid in shape whose axis lies in line with that of the piston. This peduncle is electrically insulated from the piston by means of the dielectric (21) and possesses a negative charge supplied by the shoe (24) insulated from the piston itself, and which slides on its brush (25). By means of a device, diagrammatically shown by (23), as the air-fuel mixture passes through the tube (22) to feed the chamber, it too is negatively charged. The effect of the peduncle's negative charge is to repel the minute drops of fuel thus creating the cavity (26) more or less hyperboloid in shape, in the main corresponding to the surface of the peduncle and, practically speaking, placed between the mass of fuel (27) and the peduncle itself.

At the same time the particles of the mixture tend to gather round the electrode of the opposing pole on the plug (15) forming an enriched zone (28).

Generation of the various negative or positive loads, with optimum values of intensity or tension, is done by varied types of devices according to the different uses made of the engine; such devices may be electrostatic or dynamoelectrical and in the main are known already so that, for the sake of brevity, they are not described in detail here.

The advantages of the invention are clearly seen.

Figure 3:
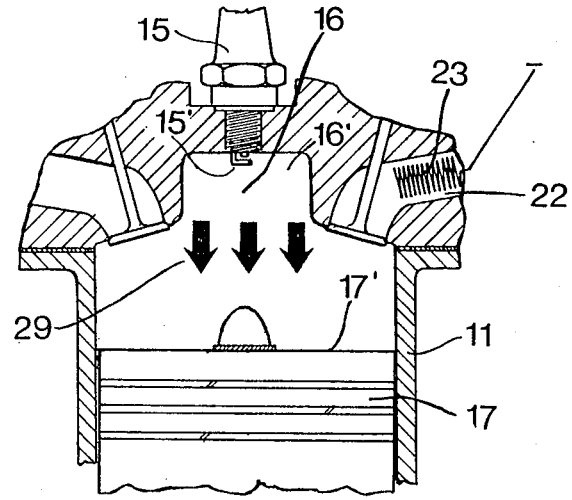
FIG. 3: shows a detail of a cylinder during an explosion.

As occurs in the "hollow charges" of explosives generally especially in projectiles, the gas created by explosion of the mixture is, as shown in FIG. 3, thus concentrated in a cylindrical jet (29) directed in a line opposite to that of ignition, namely of the plug, and therefore towards the piston. The working effect is thus multiplied causing considerable increase of pressure on the piston itself and therefore giving it greater speed and propulsive force. The concentration of fuel near the plug further improves combustion producing effects similar to those of the "stratified" load.

All the above leads to increased yield, lower consumption for an equivalent power or an increase in power with equivalent consumption.

As the applications of the invention have been described as examples of its use but in no way limiting it to these, it is understood that every equivalent application of the inventive concepts explained and every product made and/or in operation according to the characteristics of the invention will be included in its field of protection.

I claim:

1. An alternating endethermic engine, comprising a case; a cylindrical chamber in said case; a piston slidable in said chamber and having an end; a portion of said chamber above said piston forming a substantially cylindrical combustion chamber; means for injecting air-fuel mixture into said combustion chamber; means for providing ignition in said combustion chamber situated opposite to said end of the piston and operative to produce an explosive mixture in said combustion chamber, said piston being provided with a projection axially outwardly extended from its end towards said ignition means; first means for charging said projection with electric charges; and second means in said injecting means for charging fuel-air mixture passing therethrough with electric charges, said projection and the mixture passing through the injecting means being charged with electric charges of the same sign whereby drops of fuel are produced in said combustion chamber to constitute an explosive charge of mixture of air and fuel, said drops due to repulsion between electric charges of said projection and the charged fuel particles being collected at a predetermined distance from said projection so as to form a cavity about said projection and of a shape substantially corresponding to that of said projection but of the size larger than that of said projection so that due to the known per se "Munroe effect" of hollow charges an explosive wave is caused which is concentrated into a substantially cylindrically-shaped jet aligned with said piston and increasing the effect of the explosion.

2. The engine as defined in claim 1, wherein said first and second means charge said projection and said injecting means, respectively, with the negative charge.

3. The engine as defined in claim 1, wherein said projection has a cross-section gradually decreasing towards said ignition means.

4. The engine as defined in claim 3, wherein said projection is conical.

5. The engine as defined in claim 1, wherein said projection has a hyperboloidal shape.

6. The engine as defined in claim 2, wherein said negative charge is provided by connecting said first and second charging means to respective electricity generators.

7. The engine as defined in claim 1, wherein said prejection is isolated from the piston and provided with a rodlike contact and an electric brush for connecting said projection to a generator of negative charge.

8. The engine as defined in claim 1, said combustion chamber being formed by side walls of said case, which are charged with electric charges of the same sign as said projection and said fuel-air mixture passing through said injection means.

9. The engine as defined in claim 1, wherein said ignition means is a spark plug mounted in said case.

* * * * *